Patented Feb. 14, 1928.

1,659,086

UNITED STATES PATENT OFFICE.

ELTON R. DARLING, OF DECATUR, ILLINOIS, ASSIGNOR TO THE HYDRAULIC PRESS MANUFACTURING COMPANY, OF MOUNT GILEAD, OHIO.

MANUFACTURE OF HIGH-GRADE APPLE JUICE.

No Drawing.  Application filed November 10, 1926.  Serial No. 147,617.

The invention herein disclosed relates to a process of preparing a high grade cider which is characterized by having an unusually fine aroma, color, flavor and food value and also by having a much higher content of fruit sugar than is usual.

In the ordinary process of the manufacture of cider the apples are first crushed and subjected to pressure whereby the juice is obtained. A close study of the structure of the apple discloses the presence of a multitude of starch cells, which, during the process of expressing the juices act to prevent to a great degree the breaking down of the cell structure and therefore cause the retention of certain constituents including fruit sugars which if permitted to enter the juice would add very materially to the flavor, the aroma and food value thereof.

Careful experiments have shown that by a process carried out in accordance with the invention herein disclosed, it is possible to break down the starch cells thus freeing the constituents otherwise retained thereby which may then pass into the juice and also the starch may be converted into fruit sugars.

It has long been known that enzymes have a great value in the preparation of food stuffs for human consumption and certain of these have the properties of converting starches into simple sugars which are easily assimilated. The present invention has applied these principles to a new use and as a result of the process a cider of unusual value is obtained.

The apples are first ground by any ordinary method and the pomace is placed in a tank which contains an agitator and means for heating. The enzyme which is preferred for the purpose of this invention is diastase and may be prepared by a method well known in the arts which consists in making a water extract of pure barley malt. This is best done by extracting one pound of the barley malt with one quart of water.

It is not possible to state the exact amount of enzyme which must be added to the pomace in order to convert the total starch into sugar but this must be controlled chemically and is determined as follows:

For each one hundred pounds of ground apples or pomace which is agitated in the tank and heated to approximately 135° F. there is added one quart of the water solution of the barley malt extract. At the end of fifteen minutes a small amount of the pomace is taken and tested for starch by means of iodine solution. If no color results, it is shown that all of the starch cells have been broken down and converted into sugar. If a blue color results, it is apparent that more of the enzyme is necessary, and a further addition of the barley malt will be made, the amount thereof depending upon the brightness of the color resulting from the first test. At the end of another interval, a second test will be made and if necessary a further amount of enzyme added.

When the tests show that the pulp or pomace is free from starch, it is run into press plates and the juice expressed by means of pressure. It is found preferable to treat the juice with silicious matter such as diatomaceous earth and to use the plate type of filter press, although this is not imperative. It is also desirable to filter, bottle and Pasteurize the juice so that it may keep indefinitely in unchanged form for beverage purposes although the resulting juice may be used in any way in which cider produced by other methods is employed.

It is obvious that minor changes in the manner of carrying out the process may be made since other forms of enzymes may be used instead of diastase and such other forms of enzymes may have their best effect at a temperature differing somewhat from that set forth above. While it is found preferable to control the action by chemical tests, nevertheless the invention has marked value even if there is not added a sufficient amount of enzyme to break down all of the starch cells. The method as described is believed to set forth the preferred form of the invention but the invention is to be regarded as limited only by the scope of the appended claims.

I claim as my invention:

1. A process for the manufacture of apple juice which comprises treating the pomace with an enzyme to break down the starch cells.

2. A process for the manufacture of apple juice which comprises treating the pomace with diastase to break down the starch cells.

3. A process for the manufacture of apple juice which comprises treating the pomace with diastase in the form of a barley malt extract to break down the starch cells.

4. A process for the manufacture of apple juice which comprises adding an enzyme to the pomace, heating to about 135° F., and agitating to break down the starch cells.

5. A process for the manufacture of apple juice which comprises adding diastase to the pomace, heating to about 135° F., and agitating to break down the starch cells.

6. A process for the manufacture of apple juice which comprises adding a sufficient quantity of diastase to the pomace before pressing to convert the starch into fruit sugars, heating to about 135° F., agitating the mixture, pressing and filtering through a filter press after the starch has been converted.

In testimony whereof, I have hereunto subscribed my name.

ELTON R. DARLING.